United States Patent Office 3,210,360
Patented Oct. 5, 1965

3,210,360
PROCESS FOR PRODUCING 4:4'-BIPYRIDYLS
Frank Raymond Bradbury and Alastair Campbell, Widnes, England, assignors to Imperial Chemical Industries Limited, Millbank, London, England, a corporation of Great Britain
No Drawing. Filed May 9, 1962, Ser. No. 193,627
Claims priority, application Great Britain, May 18, 1961, 18,166/61
18 Claims. (Cl. 260—296)

This invention relates to an organic chemical process for the manufacture of organic bases, more particularly for the manufacture of bipyridyls.

We have now found that bipyridyls may be produced in good yields by the interaction of a pyridine and magnesium and oxidation of the product so produced. We have found further that the mixture of bipyridyls so produced usually contains at least 90% of the 4:4'-isomer (i.e. a greater proportion than is present in the mixtures of bipyridyls formed from a sodium-pyridine interaction product) and that high yields of bipyridyls based on the magnesium consumed may be obtained in many cases.

According to the invention, therefore, we provide a process for the manufacture of bipyridyls which comprises interacting a pyridine and magnesium, and oxidising the interaction product thus formed.

The magnesium may be used in any convenient form, and preferably one having a large surface area, for example turnings or powder. Pure magnesium or an alloy of magnesium containing minor proportions of other metals may be used. The surface of the metal should be as clean as possible to facilitate reaction.

The interaction of the magnesium and the pyridine is usually very slow to start, and is preferably started by a small proportion of an initiator in the pyridine-magnesium mixture. Suitable initiators are materials which can induce the formation of free radicals in the magnesium-pyridine mixture, and include in particular the alkali metals (for example lithium, sodium and potassium), the more active alkaline earth metals (calcium, strontium and barium) and the halogens (particularly bromine and iodine). When the initiator is a metal, it should be used in the form of a finely ground or dispersed form, preferably in some inert diluent which prevents oxidation of the metal surface and preserves it in an active state. When the initiator is a halogen, it may be added as such or as a solution, for example in an inert diluent or in the pyridine.

It is preferred to use a dispersion of sodium or potassium as initiator, since these materials are especially efficient and readily available. Such dispersions may be readily prepared by known methods, for example by mechanical or ultrasonic agitation of the molten metal in an inert diluent. The inert diluent may be selected so as to have a boiling point which is convenient in the preparation of the dispersion or in the subsequent operations. Suitable diluents include liquid (or readily melted) hydrocarbons, for example petroleum fractions and alkylated benzenes.

The proportion of initiator to be used may vary. In general, appropriate proportions are at least 1%, and preferably between 2% and 5% by weight of the magnesium present in the mixture to be interacted. Larger proportions may be necessary in some cases, for example when the magnesium is not clean or when the pyridine-magnesium mixture is not dry, and proportions of 10% or more of the magnesium present may be required in extreme circumstances. Smaller proportions may suffice in some cases, for example when the reactants are very pure. The magnesium-pyridine interaction product is also effective as an initiator so that, once the interaction has commenced, further additions of magnesium and/or the pyridine may be made without necessarily requiring more initiator.

The interaction between the magnesium and the pyridine may conveniently be carried out at temperatures up to the reflux temperature (i.e. boiling point) of the interaction mixture, though the interaction tends to be inconveniently slow below 80° C. Higher or lower interaction temperatures may be used if desired, however. It is usually most convenient to carry out the interaction at atmospheric pressure, but higher or lower pressures may be used if desired. We prefer to carry out the interaction at a temperature in the range 90° C. to 120° C, for the best combination of speed and efficiency of reaction.

The time required for the interaction varies with the particular materials and interaction conditions employed, and is longer when lower interaction temperatures are used. Interaction may be completed in as little as five minutes or as long as twelve hours. The more vigorous and lengthy interaction conditions, or the extended heating of the interaction mixture after interaction has ceased, may modify to some extent the relative proportions of the isomeric bipyridyls in the product. In general, the shorter interaction periods tend to favor the formation of the 4:4'-bipyridyl isomer.

The interaction may be carried out in the presence of a diluent, which is preferably a solvent for the bipyridyls and for the magnesium-pyridine interaction product. An excess of the pyridine can be used as this solvent diluent. This avoids any possible coating of the magnesium with any of the reaction products which would prevent further reaction.

The course of the reactions taking place during the process of the present invention is not clear. It appears that at least two molecular proportions of the pyridine are required for each atomic proportion of magnesium consumed in the interaction, though an excess of the pyridine is preferably used for example as a diluent. Interaction may be discontinued, if desired, before all the magnesium present has been consumed. Any unreacted magnesium or pyridine remaining need not necessarily be removed before oxidation of the interaction product takes place.

The mechanism of the oxidation of the magnesium-pyridine interaction product is especially obscure, so we use the term "oxidation" in the sense of including any process which effects removal of hydrogen or electrons from the magnesium-pyridine interaction product. The oxidation may be carried out by means of oxygen, or mixtures thereof with an inert diluent gas for example nitrogen. This can be carried out by bubbling the oxygen, for example in the form of air or some other mixture of oxygen and nitrogen, through the interaction product while it is stirred vigorously by means of a mechanical stirrer to promote thorough gas-liquid contact. We have found that the oxidation may also be carried out using chlorine, alone or in admixture with an inert diluent gas.

The oxidation may be carried out at any desired temperature. The optimum temperature in any particular instance and the time required for the oxidation to be completed will depend for example upon the oxidation conditions employed and may be determined by simple trial. The oxidation conditions should not be made so vigorous that the bipyridyls themselves are lost by excessive oxidation. Completion of the oxidation is usually indicated conveniently by the consumption of a calculated amount of an oxidising agent, by further reaction ceasing, or by a change in colour of the reaction mixture (usually from dark blue to brown).

We have found that is it preferable to reduce the viscosity of the reaction mixture during the oxidation step by adding a liquid diluent, usually before commencing the oxidation. If this is not done, a gelatinous mixture is usually formed during the oxidation which may prevent further oxidation taking place. Such a diluent may be water, for example in the proportion of two parts of water to each part of magnesium used; other suitable diluents include alcohols for example methanol, and hydrocarbons for example petroleum fractions and alkylated benzenes. It may be advantageous to select the diluent so as to avoid wastage or the formation of undesirable by-products, for example by reaction with any oxidising agent such as chlorine.

Commonly a mixture of isomeric bipyridyls is produced by the process of the present invention, the principal constituents being the 2:2'-, 2:4'- and 4:4'-isomers or such of these as are permitted by the structure of the pyridine used as starting material. The 4:4'-isomer usually predominates.

The pyridine for use in the process of the present invention should be as free as possible from any substituent or impurity (for example piperidine) which can take part in any undesirable side-reaction with the magnesium or the initiator. The process is especially applicable to pyridine itself. Pyridines containing hydrocarbon radicals (particularly alkyl radicals, for example methyl and/or ethyl radicals) may also be used, for example picolines and lutidines.

The bipyridyls may be isolated from the product resulting from the oxidation step by known methods, for example fractional distillation under reduced pressure, extraction with organic solvents, or combinations of such techniques. The method to be used may vary according to whether the product desired is the mixture of all the bipyridyls produced in the reaction, or particular isomers. In general, the bipyridyls may be freed first from most of the excess pyridine and any volatile diluent used by a preliminary distillation at atmospheric pressure, and then from terpyridyls and other materials by fractional distillation under reduced pressure. If desired, the reaction mixture may be extracted with a solvent in order to eliminate any magnesium hydroxide present, before or after any preliminary distillation, and this solvent then removed by distillation; suitable solvents for this purpose include methylene chloride and benzene.

4:4'-bipyridyl itself may be isolated in substantially pure form by way of its hydrochloride from the mixture of bipyridyls produced from pyridine. This may conveniently be done by dissolving the mixed bipyridyls in hot methanol, treating this solution with dry hydrogen chloride, cooling the solution so that 4:4'-bipyridyl hydrochloride separates out, removing this solid hydrochloride by filtration, and converting the hydrochloride to free 4:4'-bipyridyl by treatment with an alkali, for example potassium bicarbonate, sodium carbonate or caustic soda. Alternatively, the mixed bipyridyls may be converted to hydrochlorides, for example by solution in ether and treatment with dry hydrogen chloride, and the mixed hydrochlorides then washed with methanol or ethanol to free the 4:4'-bipyridyl dihydrochloride from the more soluble isomers. Higher polypyridyls, for example terpyridyls, do not interfere with this method of purification, so that the mixed polypyridyls may be extracted directly from the oxidation product with a solvent, for example, ether, and the 4:4'-bipyridyl dihydrochloride isolated as described above. 2:4'-bipyridyl may be extracted by making use of its greater solubility in water or its higher volatility when distilled with solvents, for example methylene chloride, benzene or pyridine.

The process of the present invention has the advantages of rapid reaction and ease of control with excellent yields of bipyridyls without the need for using a highly reactive alkali metal such as sodium to form the interaction product. Furthermore the oxidation step in the process of the present invention may be carried out smoothly and easily without any interference due to the formation of a gelatinous reaction mixture. This is of particular importance when the process is being worked on a commercial scale.

The bipyridyls thus produced are useful as intermediate products in chemical synthesis, as for example in the manufacture of agricultural chemicals and the like.

The invention is illustrated but not limited by the following examples in which the parts and percentages are by weight.

*Example 1*

316 g. of pyridine were heated with 9.6 g. of magnesium turnings under nitrogen and, when the temperature of the mixture reached 115° C., interaction was initiated by the addition of a finely divided dispersion of sodium (0.44 g. of sodium metal in 2 cc. of trimethyl benzene). Refluxing of the mixture under nitrogen was continued for 2½ hours. The reaction mixture was then cooled to 80° C., diluted with 100 cc. of trimethylbenzene, and air was blown through at 20 litres per hour for 9 hours. The resulting oxidised product was found to contain:

| | Percent |
|---|---|
| 2:2'-bipyridyl | 0.6 |
| 2:4'-bipyridyl | 0.3 |
| 4:4'-bipyridyl | 9.5 |

The yield of bipyridyls was 62.5% of theory (based on the magnesium assuming this to be divalent).

Similar results were obtained when this procedure was repeated using 3 times and 5½ times the quantity of sodium dispersion specified above.

*Example 2*

316 g. of pyridine were heated with 9.6 g. of magnesium turnings under nitrogen and when the temperature of the mixture reached 115° C., interaction was initiated by the addition of a finely divided dispersion of sodium (0.44 g. of sodium metal in 2 cc. of trimethyl benzene). The reaction mixture was refluxed under nitrogen for 45 minutes then cooled to 90° C. and 15 cc. of water added. Air was then blown through the reaction mixture at 25 litres per hour for 3½ hours, the temperature being maintained at 90° C. during this oxidation step. The oxidised product was found to contain:

| | Percent |
|---|---|
| 2:2'-bipyridyl | 1.3 |
| 2:4'-bipyridyl | 0.7 |
| 4:4'-bipyridyl | 9.4 |

The yield of bipyridyls was 70% of theory (based on the magnesium assuming this to be divalent).

Similar results were obtained when this procedure was repeated using potassium in place of sodium.

*Example 3*

395 parts of pyridine and 12 parts of magnesium turnings were heated together at 90° C. and interaction was initiated by addition of 0.44 part of sodium metal in the form of a finely divided dispersion in approximately five times its weight of trimethylbenzene. The mixture was then heated for 5 hours under nitrogen and then oxidised in the manner described in Example 2. The resulting oxidised product was found to contain 0.2% of 2:2'-bipyridyl, 0.9% of 2:4'-bipyridyl and 9.0% of 4:4'-bipyridyl.

Repetition of this procedure except that interaction of the pyridine and magnesium is carried out at 100° C. for 2 hours under nitrogen, gave an oxidised product containing no 2:2'-bipyridyl, 0.6% of 2:4'-bipyridyl and 9.2% of 4:4'-bipyridyl.

*Example 4*

395 parts of pyridine and 12 parts of magnesium turnings were heated together at 115° C. and interaction was initiated by addition of 1.7 parts of lithium metal pieces. The mixture was heated for ½ hour at 115° C. under nitrogen, and then oxidised in the manner described in Example 2. The resulting oxidised product was found to contain 0.5% of 2:2'-bipyridyl, 0.6% of 2:4'-bipyridyl and 8.2% of 4:4'-bipyridyl.

Similar results were obtained when this procedure was repeated using 0.4 part of lithium metal and heating the mixture of magnesium, pyridine and lithium at 115° C. for 1 hour.

*Example 5*

A mixture of 23 parts of pyridine (dried over potassium hydroxide and redistilled) and 1 part of magnesium turnings was stirred and heated to reflux under an atmosphere of dry nitrogen. 1.76 parts of bromine, followed by 3.33 parts of pyridine, were then added and the mixture was maintained at reflux with stirring for 3 hours. The reaction mixture became brown, then green, and finally blue-black in colour. The mixture was then oxidised in the manner described in Example 2. The resulting oxidation product was found to contain 0.5% of 2:2'-bipyridyl, 0.2% of 2:4'-bipyridyl, and 11.1% of 4:4'-bipyridyl.

*Example 6*

A mixture of 16.3 parts of pyridine (dried over potassium hydroxide and redistilled) and 1 part of magnesium turnings (freshly drilled) were stirred and heated to reflux in an atmosphere of dry nitrogen. 0.5 part of iodine was then added and the resulting mixture was maintained at reflux for 5 hours. A blue-green colour appeared in the mixture after 1 hour reflux. The mixture was then oxidised in the manner described in Example 2. The resulting oxidation product was found to contain 1.55% of 4:4'-bipyridyl.

What we claim is:

1. In a process for preparing a bipyridyl selected from the group consisting of 4:4'-bipyridyl and 4:4'-lower alkylated bipyridyls by reacting a metal with a compound selected from the group consisting of pyridine and lower alkylated derivatives thereof followed by oxidation of the resulting intermediate product to give said bipyridyl, the improvement which comprises utilizing magnesium as the metal for reaction with said compound whereby the bipyridyl product obtained after oxidation is predominantly said bipyridyl.

2. A process for preparing 4:4'-bipyridyl which comprises reacting pyridine and magnesium in the presence of excess pyridine as diluent and from 2–5% by weight of an alkali metal initiator, based on the weight of magnesium, said reaction being carried out at a temperature in the range of 90–120° C. for a period of time between 5 minutes and twelve hours and then oxidizing the resulting product with oxygen to form an oxidation product consisting primarily of said 4:4'-bipyridyl and thereafter recovering the 4:4'-bipyridyl from said oxidation product.

3. Process as claimed in claim 1 wherein the reaction between the pyridine and the magnesium is initiated by a material which can induce the formation of free radicals in the magnesium-pyridine mixture.

4. Process as claimed in claim 3 wherein the initiator is an alkali metal.

5. Process as claimed in claim 4 wherein the initiator is a dispersion of alkali metal selected from the group consisting of sodium and potassium.

6. Process as claimed in claim 3 wherein the initiator is a halogen.

7. Process as claimed in claim 6 wherein the initiator is selected from the group consisting of bromine and iodine.

8. Process as claimed in claim 1 wherein the proportion of initiator is at least 1% by weight of the magnesium present in the mixture to be interacted.

9. Process as claimed in claim 8 wherein the proportion of initiator is between 2% and 5% by weight of the magnesium present in the mixture to be interacted.

10. Process as claimed in claim 1 wherein said compound is pyridine.

11. Process as claimed in claim 1 wherein said compound is an alkyl pyridine containing a hydrogen atom in the 4-position of the pyridyl ring.

12. Process as claimed in claim 1 wherein the reaction between said compound and magnesium is carried out at a temperature of at least 80° C.

13. Process as claimed in claim 12 wherein the reaction is carried out at a temperature in the range 90° C. to 120° C.

14. Process as claimed in claim 1 wherein the reaction is carried out in the presence of an inert diluent which is a solvent for bipyridyls and the magnesium-pyridine reaction product.

15. Process as claimed in claim 14 wherein the diluent is an excess of the said compound.

16. Process as claimed in claim 1 wherein the oxidation is carried out by a member of the group consisting of oxygen and mixtures of oxygen with an inert diluent gas.

17. Process as claimed in claim 1 wherein the oxidation is carried out with chlorine.

18. Process as claimed in claim 1 wherein the oxidation is carried out in the presence of an inert liquid diluent which reduces the viscosity of the mixture.

References Cited by the Examiner

UNITED STATES PATENTS 2,773,066  12/56  Linnell et al. _____ 260—296

OTHER REFERENCES

Smith: J. Am. Chem. Soc., vol. 46, pp. 414–9 (1924).
Zalilan et al.: J. Am. Chem. Soc., vol. 77, pp. 6207–9 (1955).

WALTER A. MODANCE, *Primary Examiner.*

DUVAL T. McCUTCHEN, NICHOLAS S. RIZZO,
*Examiners.*